(12) United States Patent
Vivanco

(10) Patent No.: US 9,609,543 B1
(45) Date of Patent: Mar. 28, 2017

(54) DETERMINING A TRANSMISSION ORDER OF DATA PACKETS IN A WIRELESS COMMUNICATION SYSTEM

(71) Applicant: Sprint Spectrum LP, Overland Park, KS (US)

(72) Inventor: Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 108 days.

(21) Appl. No.: 14/501,280

(22) Filed: Sep. 30, 2014

(51) Int. Cl.
*H04W 28/02* (2009.01)
*H04L 12/861* (2013.01)
*H04L 12/859* (2013.01)
*H04W 72/04* (2009.01)
*H04L 12/853* (2013.01)
*H04L 12/863* (2013.01)

(52) U.S. Cl.
CPC ..... *H04W 28/0268* (2013.01); *H04L 47/2416* (2013.01); *H04L 47/2475* (2013.01); *H04L 47/626* (2013.01); *H04L 49/9057* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| 7,852,763 B2 | 12/2010 | Ghanadan et al. | |
| 2004/0223505 A1* | 11/2004 | Kim | H04L 12/5693 370/412 |
| 2006/0085543 A1* | 4/2006 | Hrastar | H04L 63/1408 709/224 |
| 2007/0230335 A1* | 10/2007 | Sang | H04L 12/5695 370/230 |
| 2007/0297415 A1* | 12/2007 | Lee | H04L 12/5693 370/395.4 |
| 2008/0049757 A1* | 2/2008 | Bugenhagen | H04L 12/2602 370/395.1 |
| 2008/0056192 A1* | 3/2008 | Strong | H04L 12/5693 370/331 |
| 2010/0271963 A1* | 10/2010 | Koorapaty | H04L 1/0003 370/252 |
| 2011/0026546 A1 | 2/2011 | Zubow et al. | |
| 2012/0327950 A1* | 12/2012 | Gotz | H04L 47/245 370/412 |
| 2013/0135996 A1* | 5/2013 | Torres | H04L 41/5022 370/230 |
| 2013/0290656 A1* | 10/2013 | Staelin | G06F 9/5083 711/158 |

(Continued)

*Primary Examiner* — Chi H Pham
*Assistant Examiner* — Vladislav Agureyev

(57) ABSTRACT

In systems and methods of determining a transmission order of packets in a wireless communication network, one method includes determining an efficiency of time frequency frame allocations performed by a network node over a predetermined period of time. The method also includes determining when the efficiency of the time frequency frame allocations is below a threshold. The method further includes rearranging two or more time frequency frames in one or more time transmission intervals when the efficiency of the time frequency frame allocations is determined to be below the threshold.

19 Claims, 7 Drawing Sheets

(56) References Cited

U.S. PATENT DOCUMENTS

2013/0322255 A1* 12/2013 Dillon .................... H04L 47/22
370/236
2015/0036733 A1* 2/2015 Smadi ................. H04N 19/172
375/240.01

* cited by examiner

DETERMINING A TRANSMISSION ORDER OF DATA PACKETS IN A WIRELESS COMMUNICATION SYSTEM

TECHNICAL BACKGROUND

Wireless communication systems typically support communication between a wireless device and a wireless communication network, for example, via one or more frequency bands or carriers. In such systems, one or more network nodes, such as gateway or access nodes, may utilize a delivery schedule to attempt to deliver data to the wireless device in the proper sequence by prioritizing time-sensitive data over time-insensitive data. For example, in a typical packet-switched network, data transfer units, referred to as "packets," are scheduled for delivery to the wireless device according to a difference between an amount of time spent in queue before delivery and an allowable total amount of time in queue. Typically, packets encoding data for time sensitive applications (e.g., video or voice communications) have a smaller allowable total amount of time spent in queue than packets encoding data for less time sensitive applications (e.g., web browser communications). Accordingly, the scheduler may prioritize delivery of the time sensitive packets while allowing the less time sensitive packets to remain in queue longer.

OVERVIEW

A method is provided for determining a transmission order of packets in a wireless communication network. The method includes determining an efficiency of time frequency frame allocations performed by a network node over a predetermined period of time. When the efficiency of the time frequency frame allocations is determined to be below a threshold, two or more time frequency frames are rearranged in one or more time transmission intervals.

DETAILED DESCRIPTION

Figure 1:
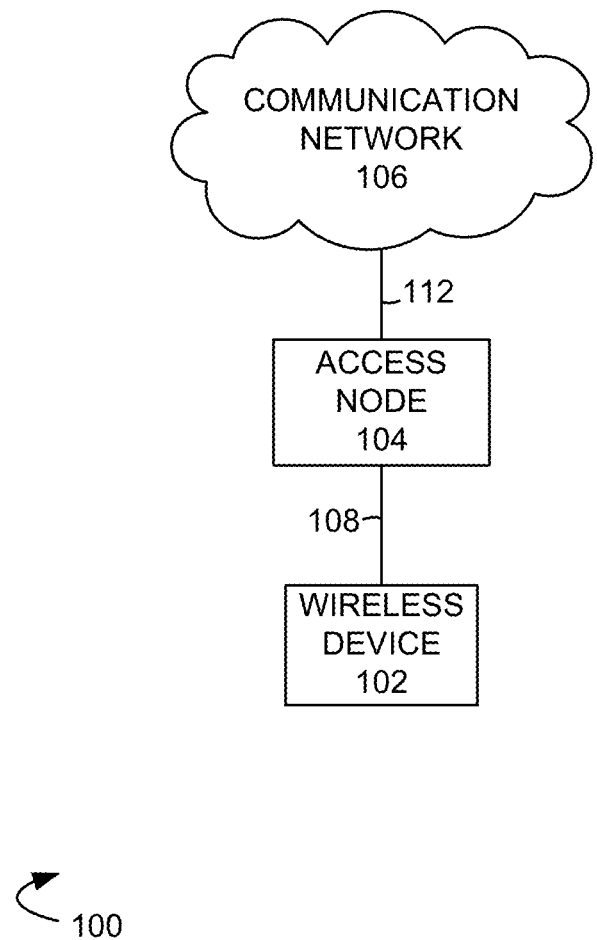
FIG. 1 illustrates an exemplary communication system to transmit data packets to a wireless device.

FIG. 1 illustrates an exemplary communication system 100 to process a call request and includes wireless device 102, access node 104, and communication network 106. Examples of wireless device 102 can include a cell phone, a smart phone, a computing platform such as a laptop, palmtop, or tablet, a personal digital assistant, or an internet access device, including combinations thereof. Wireless device 102 can communicate with access node 104 over communication link 108. Communication links 108 and 110 can each include a frequency band. While two frequency bands are illustrated in FIG. 1 for conciseness, access node 104 and wireless device 102 can also communicate over a greater number of frequency bands.

Access node 104 is a network node capable of providing wireless communications to wireless device 102, and can be, for example, a base transceiver station, a radio base station, a NodeB (NB) device, or an enhanced eNB device. Access node 104 is in communication with communication network 106 over communication link 112.

Communication network 106 can be a wired and/or wireless communication network, and can include processing nodes, routers, gateways, and physical and/or wireless data links for carrying data among various network elements, including combinations thereof, and can include a local area network, a wide area network, and an internetwork (including the Internet). Communication network 106 can be capable of carrying voice information and other data, for example, to support communications by a wireless device such as wireless device 102. Wireless network protocols may include code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 106 include Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also include a wireless network, including base stations, wireless communication nodes, telephony switches, internet routers, network gateways, computer systems, communication links, or some other type of communication equipment, and combinations thereof.

Communication links 108, 110 and 112 can be wired or wireless communication links. Wired communication links can include, for example, twisted pair cable, coaxial cable or fiber optic cable, or combinations thereof. Wireless communication links can include a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106, which are omitted for clarity, including additional processing nodes, routers, gateways, and physical and/or wireless data links for carrying data among the various network elements.

In a wireless communication network, such as communication system 100, data, in the form of packets, can be transferred to a wireless device in an order determined by a scheduler. In some embodiments, the scheduler may use delay-based scheduling (DBS) to determine the order in which the packets will be transmitted to the wireless device. In DBS, packets received by an access node for transmission to the wireless device are queued for transmission based on their respective packet age and a packet delay budget (PDB) associated with the type of data encoded in each packet. For example, packets associated with real time applications (e.g., video or voice communications) may have shorter PDBs than packets associated with non-real time applications (e.g., web browsing communications). DBS may improve uplink and downlink throughput for real time applications in instances in which the transmitted data includes both real time and non-real time data. However, DBS is also associated with certain drawbacks. For example, the focus on delivering real time packets prior to expiration of their PDBs may result in inefficient allocation of time frequency frames (e.g., physical resource blocks) in time transmission intervals (TTIs), increased overhead, packet segmentation, and so forth.

For further example, in some LTE systems, packet segmentation may occur at the radio link control (RLC) layer of the wireless device 102 and/or the access node 104. In such embodiments, the RLC layer receives service data units (SDUs) and generates RLC protocol data units (PDUs) for transfer to another layer in the protocol architecture. During this process, if one or more received RLC SDUs are large and/or the available radio data rate is low, the RLC SDU may be split into several RLC PDUs, thus leading to segmentation of the received RLC SDUs. This segmentation at the RLC layer may be undesirable in certain instances because it leads to increased overhead and control signaling, thus rendering the overall system less efficient.

To address these drawbacks, in operation, the communication system 100 provided herein may optimize the scheduling of the packets for transmission from the access node 104 to the wireless device 102. More particularly, the access node 104 may monitor the efficiency of the packet transmission (e.g., by monitoring the efficiency of time frequency frame allocations) and rearrange the transmission order of the packets (e.g., by rearranging time frequency frames in TTIs) when a predetermined efficiency minimum has not been met. In this way, some disclosed embodiments may enable a reduction of overhead and control signaling as compared to traditional DBS.

Figure 2:
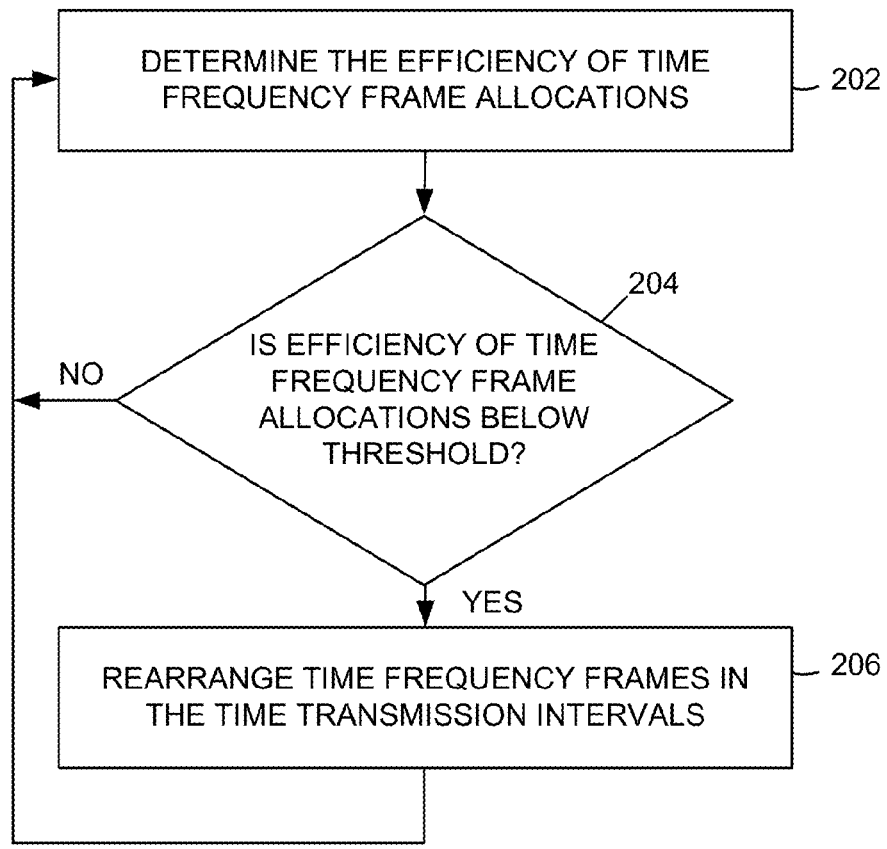
FIG. 2 illustrates an exemplary method of determining a transmission order of data packets to a wireless device.

In the embodiment shown in FIG. 2, an exemplary method of transmitting data packets to a wireless device is provided. In this embodiment, the method includes determining an efficiency of time frequency frame allocations (block 202). For example, in one embodiment, the time frequency frame allocations may be physical resource block allocations in a given TTI, and the efficiency of the physical resource block allocations may be determined in block 202. Further, in some embodiments, determining the efficiency of the time frequency frame allocations may include determining a quantity of non-real time data packets segmented across one or more TTIs over a given period of time. That is, the efficiency of the allocations may be quantified as the number of non-real time data packet segmentations that occurred during a period of interest. In some embodiments, the period of interest may be approximately 5 minutes, approximately 10 minutes, approximately 15 minutes, or any other desired implementation-specific time period.

However, in other embodiments, the efficiency of the time frequency frame allocations may be determined in a variety of other suitable ways. For example, in some embodiments, the efficiency of the allocations may be determined by determining the number of real time packet segmentations over a given period of time. In another embodiment, the efficiency of the allocations may be determined by determining a total number of all data packet segmentations (e.g., including real time and non-real time packets) in a given time period. Still further, in embodiments in which the efficiency determination is made based on a distinction between real time and non-real time packets, the non-real time packets may be distinguished from the remainder of the packets based on a service level priority, such as a quality of service class identifier, associated with each packet.

For example, in some embodiments, a service level priority may be based on a variety of factors. For example, a service level priority can be based on an allocation priority associated with a quality of service parameter, such as an allocation and retention priority value. In one embodiment, an allocation priority can be associated with a wireless device, for example, according to information from communication network 106. The information can be provided by a network element such as a home subscriber server (HSS), a home location register (HLR), or another network element of communication network 106.

A service level priority can also be based on a priority associated with an application running on a wireless device, or a priority related to a requested service, such as a quality class indicator, or a service flow class indicator, or other similar indicator. A service level priority can also be based on a guaranteed data rate, or a guaranteed bandwidth, which may be required for a wireless device. A service level priority can also be based on an application requirement of an application running on a wireless device, such as a required minimum data rate, a maximum permitted delay, a maximum permitted error rate, or some other application requirement. As another example, a service level priority can be determined for a wireless device when the wireless device is provisioned in a communication network. As an example, a wireless device can be associated with a high priority (such as a service level priority of 1) when the wireless device is intended for use by emergency response or public safety personnel. A service level priority can also be based on combinations of any of the foregoing.

Once the efficiency of the time frequency frame allocations is determined, the method of FIG. 2 further includes inquiring as to whether the time frequency frame allocations are below a predetermined threshold (block 204). In some embodiments, this inquiry may be made during a time of day when the communication network is loaded and may not be made during the time of day when the network is not loaded. However, in other embodiments, this determination may be made throughout the day, not limited by the load status of the network.

When the time frequency frame allocations are determined to be below the threshold, the method includes rearranging the time frequency frames in the TTIs (block 206) to attempt to increase the efficiency above the threshold. For example, the method may include rearranging physical resource blocks in the TTIs to attempt to increase the efficiency and reduce overhead and control signaling, as described in more detail below with respect to FIGS. 4A-C. When the time frequency frame allocations are above the threshold, the method includes continuing to monitor the efficiency of the time frequency frame allocations (block 202).

Figure 3:
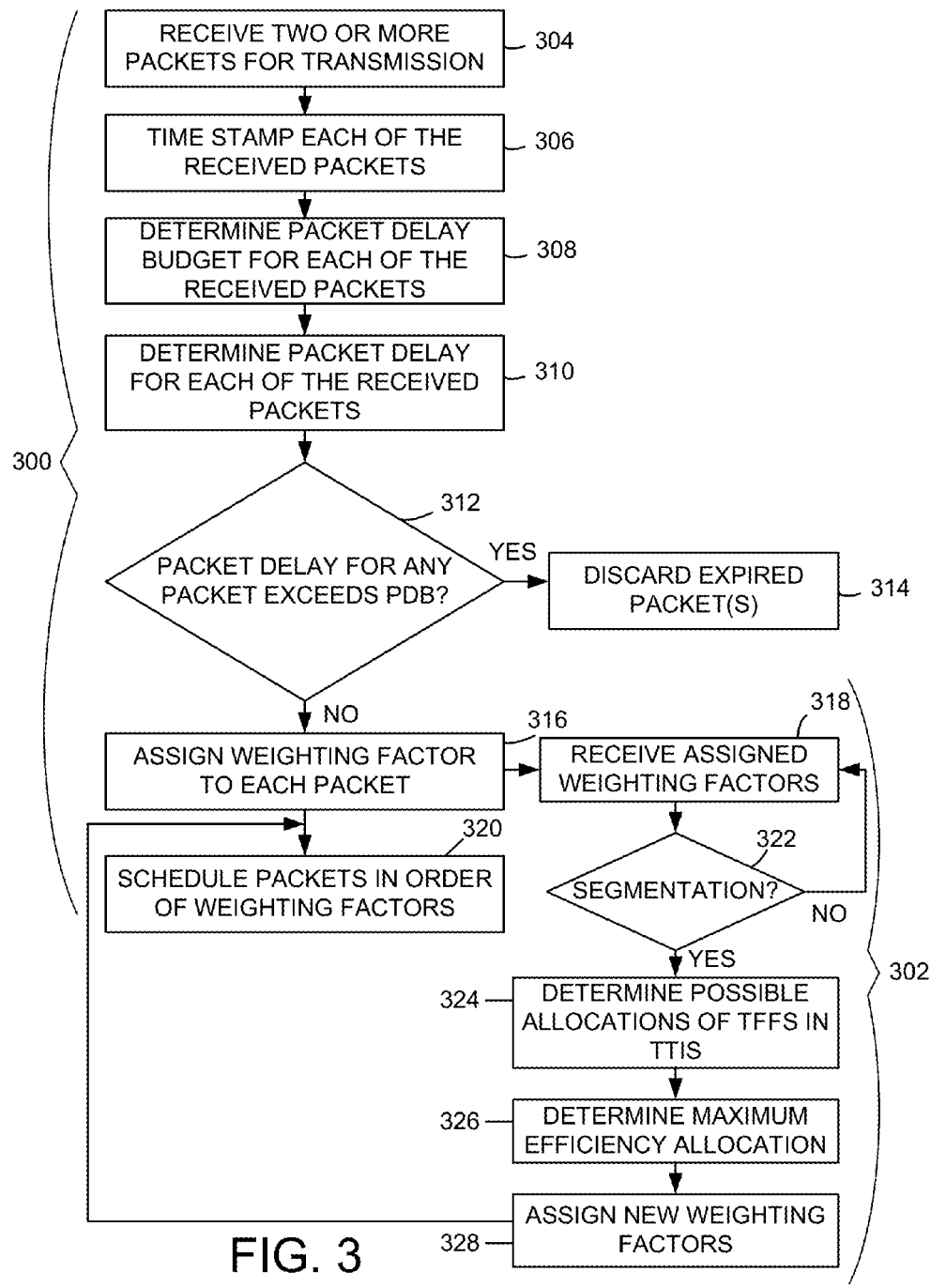
FIG. 3 illustrates another exemplary method for determining a transmission order of data packets to a wireless device.

FIG. 3 illustrates an embodiment of a method for determining a transmission order of packets in a wireless communication system. The method generally includes a scheduling sub-method 300 and a monitoring and rearranging sub-method 302. The scheduling sub-method 300 may be used by a scheduler of a network node (e.g., an eNB) to determine a transmission order of the packets in accordance with a desired protocol, such as DBS. The monitoring and rearranging sub-method 302 may monitor the efficiency of the scheduling performed in accordance with the scheduling sub-method 300 and rearrange the transmission order of the packets if the efficiency does not meet a desired threshold (e.g., if segmentation has occurred).

In some embodiments, the scheduling sub-method 300 may be performed by a scheduler of the access node or other network node, and the rearranging sub-method 302 may be performed by another controller or processor. In such embodiments, the alternate controller or processor may override or change portions of the actions taken by the scheduler in an attempt to increase efficiency. However, in other embodiments, the scheduling sub-method 300 and the rearranging sub-method 302 may be performed by a single network node or a single component of a network node.

Turning now to the scheduling sub-method 300, two or more packets are received for transmission (block 304), and each packet is time stamped upon receipt (block 306). For example, the eNB may receive a series of packets, one at a time or concurrently, for transmission to the wireless device, and may note the arrival order and/or arrival time of the packets. The scheduling sub-method 300 also includes determining a packet delay budget (PDB) for each of the received packets (block 308). In some embodiments, the PDB may correspond to an allowable amount of time a given packet may remain in queue before being transmitted to its destination, and may be given by the following equation:

$$d_i(t) = T_i - W_{i,t}, \quad (1)$$

in which $d_i(t)$ is the PDB, $T_i$ is the PDB of user i, and $W_{i,t}$ is the packet delay of user i at time t. In some embodiments, the PDB may be associated with the type of data encoded in each packet, with time sensitive data having shorter PDBs than time insensitive data. For example, packets associated with real time applications (e.g., video or voice communications) may have shorter PDBs than packets associated with non-real time applications (e.g., web browsing communications). By assigning PDBs in this manner, the system may reduce or eliminate the likelihood that the end user will experience disruptive delays when performing tasks with greater time sensitivity.

Once the PDB is determined, either in accordance with equation (1) or another suitable method (e.g., accessing a lookup table), the packet delay for each of the received packets is determined (block 310). That is, the difference between the current time and the arrival time of the packet at the network node is computed to determine the amount of time each packet has been delayed at the network node before being transmitted.

The scheduling sub-method 300 further includes inquiring as to whether the packet delay for any of the received packets exceeds the PDB for that packet (block 312). In the illustrated embodiment, for any packet in which the packet delay exceeds the PDB, the expired packet is discarded (block 314). However, it should be noted that in other embodiments, the method may not include discarding the expired packets. Instead, certain embodiments of the method may include delivering the expired packets even when the packet delay exceeds the PDB.

In the illustrated embodiment, for the unexpired packets, the scheduling sub-method 300 further includes assigning a weighting factor $\phi$ to $\phi_i$, where i is the number of received packets, to each packet (block 316). The weighting factors may be proportional to the time remaining for each packet before the packet delay reaches the PDB. In one embodiment, the proportionality between the weighting factor and the PBD follows an approximately linear relationship, while in other embodiments, the proportionality may be defined by a curve (e.g., with an increasing slope as the PBD increases). Once the weighting factors are assigned, the packets may be scheduled in the order of their weighting factors assigned at block 316 or in order of their weighting factors assigned at block 328 during the monitoring and rearranging sub-method 302 (block 320).

Throughout the operation of the scheduling sub-method 300, the monitoring and rearranging sub-method 302 monitors the output of the scheduling sub-method 300 to determine if rearrangement of the data packets would increase efficiency. For example, in the illustrated embodiment, the monitored output of the scheduling sub-method 300 is the weighting factors assigned at block 316. Accordingly, the monitoring and rearranging sub-method 302 includes receiving the weighting factors $\phi_1$ to $\phi_i$ assigned during the scheduling sub-method 300 (block 318) and determining if a threshold level of segmentation has occurred (block 322). However, it should be noted that in other embodiments, the input received by the monitoring and rearranging sub-method 302 may not be the weighting factors $\phi_1$ to $\phi_i$, but instead, the input may be other data indicative of the ordering of the packets performed by the scheduling sub-method 300. For example, in some embodiments, the scheduling sub-method 300 may employ a scheduling type that is not DBS, and the output of the sub-method 300 may therefore be of a different type.

In the illustrated embodiment, the monitoring and rearranging sub-method 302 of FIG. 3 proceeds by determining a plurality of possible allocations, $\Omega_1$ to $\phi_i$, of time frequency frames in the TTIs (block 324), identifying the most efficient allocation (block 326), and assigning new weighting factors to each packet to rearrange the time frequency frames in the TTIs and increase the efficiency of the method (block 328). Once assigned, the new weighting factors are received by the scheduling sub-method 300 before scheduling of the packets in order of their weighting factors at block 320.

Figure 4A:
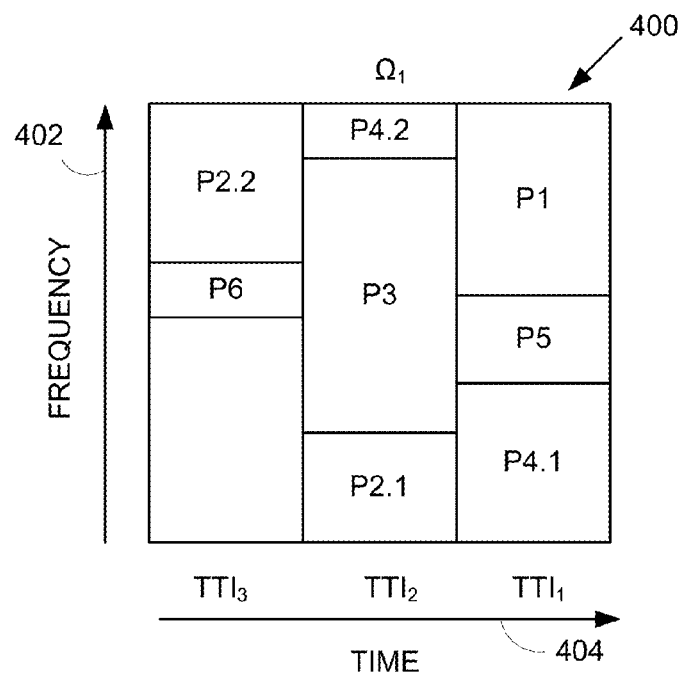
FIG. 4A illustrates an exemplary time frequency frame allocation.
Figure 4B:
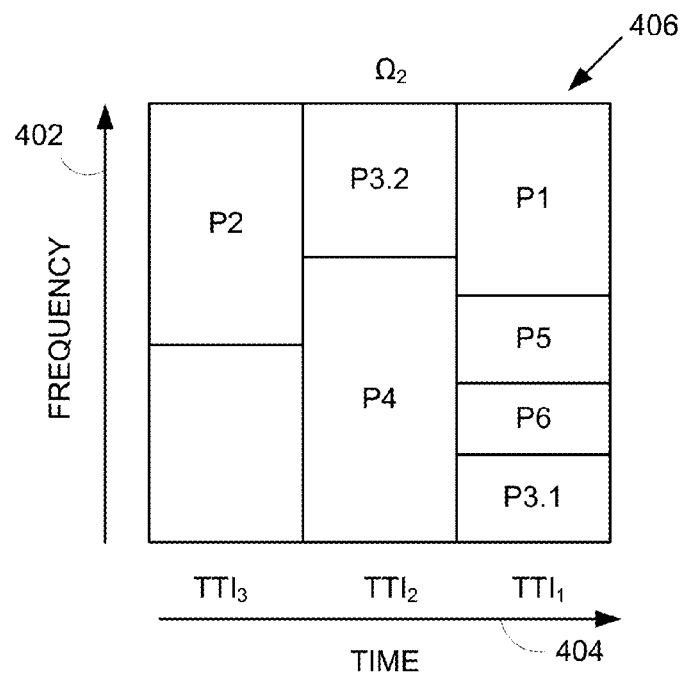
FIG. 4B illustrates another exemplary time frequency frame allocation.
Figure 4C:
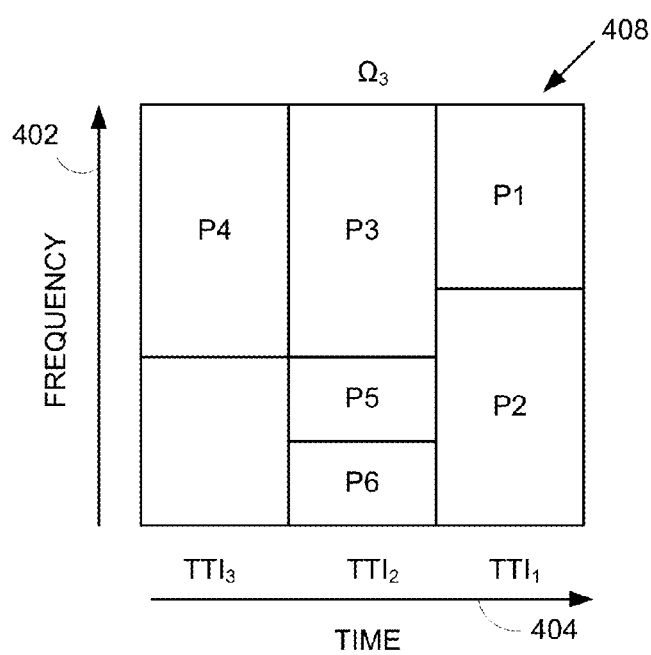
FIG. 4C illustrates another exemplary time frequency frame allocation.

FIGS. 4A-C illustrate the foregoing steps by way of example. More specifically, FIGS. 4A-C depict one possible operation of the monitoring and rearranging sub-method 302 if a threshold level of segmentation is determined to have occurred at block 322. For example, FIG. 4A is a schematic 400 illustrating one possible time frequency frame allocation, $\Omega_1$, determined at block 324; FIG. 4B is a schematic 406 illustrating a second possible time frequency frame allocation, $\Omega_2$, determined at block 324; and FIG. 4C is a schematic 408 illustrating a third possible time frequency frame allocation, $\Omega_3$, determined at block 324. However, it should be noted that the quantity of time frequency frame allocations, packets, and other features shown in FIGS. 4A-C are merely illustrative, not meant to limit presently contemplated embodiments. For example, although 6 packets, P1, P2, P3, P4, P5, and P6, are shown in FIGS. 4A-C, any number of packets could be in queue in a given application.

Further, although three time frequency frame allocations, $\Omega_1$, $\Omega_2$, and $\Omega_3$, are depicted, any number of time frequency frame allocations may be utilized in other applications. For example, in applications in which a greater number of packets are in queue, a greater number of time frequency frame allocations may need to be generated at block 324. That is, when greater levels of congestion are present at the access node, more iterations of possible combinations may be generated at block 324 because the quantity of possible allocations is increased due to the increased number of possible combinations of the packets in queue. Additionally, it should be noted that in some embodiments, the number of iterations performed at block 324 may be a predetermined number to reduce the amount of processing time required before the new weighting factors are assigned at 328. In such embodiments, the predetermined number may be chosen by taking into consideration the PDBs of the packets in queue. If the PDBs are smaller, a smaller number of iterations may be performed to attempt to deliver the packets before expiration of their PDBs.

Once the possible time frequency frame allocations, $\Omega_1$, $\Omega_2$, and $\Omega_3$, have been determined at block 324, the maximum efficiency allocation is identified at block 326 from the determined possible allocations, $\Omega_1$, $\Omega_2$, and $\Omega_3$. In one embodiment, identification of the most efficient allocation of the generated possibilities may be determined by examining the number of packet segmentations occurring in each generated possibility. For example, the schematic 400 of FIG. 4A includes a frequency axis 402 and a time axis 404 having three TTIs: $TTI_1$, $TTI_2$, and $TTI_3$. In this example two packet segmentations have occurred across TTIs. First, P4 was split into P4.1, which was assigned to $TTI_1$, and P4.2, which was assigned to $TTI_2$. Further, P2 was split into P2.1, which was assigned to $TTI_2$, and P2.2, which was assigned to $TTI_3$. However, in the example $\Omega_2$ shown in FIG. 4B, only one segmentation has occurred across the TTIs. Specifically, P3 was split into P3.1, which was assigned to $TTI_1$, and P3.2, which was assigned to $TTI_2$. Accordingly, time frequency frame allocation $\Omega_2$ may be ranked higher or more efficient than time frequency frame allocation $\Omega_1$ because fewer segmentations have occurred.

For further example, in the time frequency frame allocation $\Omega_3$ shown in FIG. 4C, no segmentations have occurred; each packet was transmitted in its entirety in a single TTI. Thus, $\Omega_3$ may be ranked higher than both $\Omega_1$ and $\Omega_2$ at block 326 because $\Omega_3$ has a reduced number of segmentations compared to each of the other possibilities generated at block 324. Accordingly, in embodiments employing the method of FIG. 3, $\Omega_3$ may be identified as the maximally efficient allocation at block 326 because a fewer number of segmentations (i.e., no segmentations) occur in $\Omega_3$ than in $\Omega_1$ and $\Omega_2$. However, in determining whether and how to rearrange the time frequency frames in the TTIs, consideration may also be given to the weighting factors 318 to 318, of the packets to ensure that if the packets are rearranged in the optimally efficient manner, the packets won't expire before being transmitted.

In accordance with the monitoring and rearranging sub-method 302, once $\Omega_3$ is identified as the maximally efficient allocation, new weighting factors may be assigned to the packets, P1-P6, to effectuate the time frequency frame allocation $\Omega_3$ when the packets are scheduled at block 320. For example, for the $\Omega_3$ in FIG. 4C, P1 and P2 would be assigned a $\phi_{max}$ so that these packets are delivered in the next TTI. P3, P5, and P6, would be assigned a $\phi_2$ so that they are delivered in the second TTI, and P4 would be assigned a $\phi_3$ such that it is delivered in the third TTI. These newly assigned weighting factors would be provided as an input to the scheduling sub-method 300 before block 320 to enable a reordering of the packets prior to scheduling in order to increase the efficiency obtained via the method in FIG. 3.

Figure 5:
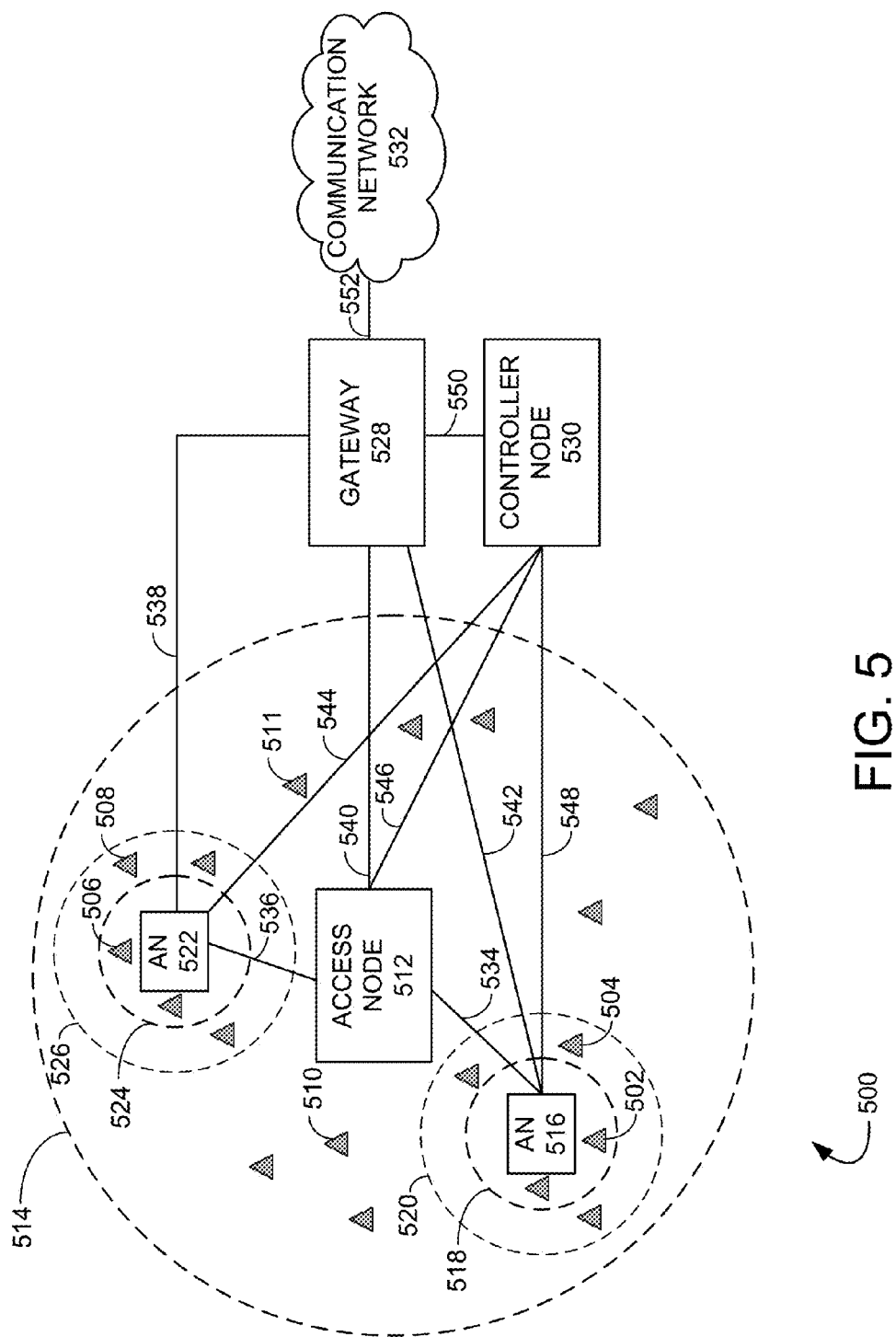
FIG. 5 illustrates another communication system to schedule communications in a wireless communication network.

FIG. 5 illustrates an exemplary communication system 500 for scheduling communication in a wireless communication network. More particularly, the communication system 500 may be utilized to schedule the transmission of data packets in a wireless communication network. Communication system 500 can comprise wireless devices 502, 504, 506, 508, 510, access nodes 512, 516, 522, gateway 528, controller node 530, and communication network 532. Other network elements may be present in the communication system 500 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 512, 516, 522 and communication network 532, which are omitted for clarity, including additional processing nodes, routers, gateways, and physical and/or wireless data links for carrying data among the various network elements.

Wireless devices 502, 504, 506, 508, 510 can be any device configured to communicate over communication system 500 using a wireless interface. For example, wireless devices 502, 504, 506, 508, 510 can include a remote terminal unit, a cell phone, a smart phone, a computing platform such as a laptop, palmtop, or a tablet, a personal digital assistant, or an internet access device, and combinations thereof.

The wireless interface of wireless devices 502, 504, 506, 508, 510 can include one or more transceivers for transmitting and receiving data over communication system 500. Each transceiver can be associated with the same or different frequency bands, the same or different radio access technologies, the same or different network providers, and/or the same or different services. For example, wireless devices 502, 504, 506, 508, 510 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), multimedia broadcast multicast service (MBMS), etc.

While not illustrated in FIG. 5 for clarity, wireless devices 502, 504 can be in communication with access node 516 through communication links. Wireless devices 506, 508 can be in communication with access node 522 through communication links. Wireless devices 510 can be in communication with access node 512 through communication links. The communication links can use various communication media, such as air, space, metal, optical fiber, or some other signal propagation path—including combinations thereof. The communication links may comprise many different signals sharing the same link. The communication links could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 502 and access node 516 could share the same representative wireless link, but be transferred over different communication sessions, frequencies, timeslots, packets, ports, sockets, logical transport links, or in different directions—including combinations thereof.

Wireless devices 502, 504, 506, 508, 510 can transmit and/or receive information over system 500 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access nodes 512, 516, 522 can be any network node configured to provide communication between wireless devices 502, 504, 506, 508, 510 and communication network 532. Access nodes 512, 516, 522 can be standard access nodes or short range, low power access nodes. In an exemplary embodiment, access node 512 can be a standard access node having a coverage area 514. Access node 516 can be short range, low power access node having a coverage area of 520, and access node 522 can be a short range, low power access node having a coverage area of 526. Access nodes 516, 522 can be within at least a portion of an overlapping coverage area 514 of access node 512, where each access node 516, 522 has a coverage area that includes a cell edge portion between the full strength coverage area 518, 524 and the edge of the cell coverage area 520, 526.

A standard access node can be a macrocell access node such as a base transceiver station, a radio base station, an eNodeB device, or an enhanced eNodeB device, or the like. In an exemplary embodiment, a macrocell access node can have a coverage area in the range of approximately five kilometers to thirty five kilometers and an output power in the tens of watts. A short range access node can include a microcell access node, a picocell access node, a femtocell access node, or the like such as a home NodeB or a home eNodeB device. In an exemplary embodiment, a microcell access node can have a coverage area of approximately two kilometers and an output power of a few watts. In another exemplary embodiment, a picocell access node can have a coverage area of approximately a half a kilometer and an output power of less than one watt. In yet another exemplary embodiment, a femtocell access node can have a coverage area in the range of 50-200 meters and an output power in the range of 0.5 to 1 watt. Femtocell access nodes can be cellular access nodes or WiFi access nodes. In addition, a wireless device configured to enter a hotspot mode can be a femtocell access node. It is noted that while three access nodes 512, 516, 522 are illustrated in FIG. 5, any number of access nodes can be implemented within system 500.

Access nodes 512, 516, 522 can comprise a processor and associated circuitry to execute or direct the execution of computer-readable instructions to obtain information. Access nodes 512, 516, 522 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 512, 516, 522 can receive instructions and other input at a user interface.

Gateway 528 can be any network node configured to interface with other network nodes using various protocols. Gateway 528 can communicate user data over system 500. Gateway 528 can be a standalone computing device, computing system, or network component, and can be accessible, for example, by a wired or wireless connection, or through an indirect connection such as through a computer network or communication network. For example, gateway 528 can include a serving gateway (SGW) and/or a public data network gateway (PGW), etc. One of ordinary skill in the art would recognize that gateway 528 is not limited to any specific technology architecture, such as Long Term Evolution (LTE) and can be used with any network architecture and/or protocol.

Gateway 528 can comprise a processor and associated circuitry to execute or direct the execution of computer-readable instructions to obtain information. Gateway 428 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway 528 can receive instructions and other input at a user interface.

Controller node 530 can be any network node configured to communicate information and/or control information over system 500. Controller node 530 can be configured to transmit control information associated with a handover procedure. Controller node 530 can be a standalone computing device, computing system, or network component, and can be accessible, for example, by a wired or wireless connection, or through an indirect connection such as through a computer network or communication network. For example, controller node 530 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 530 is not limited to any specific technology architecture, such as Long Term Evolution (LTE) and can be used with any network architecture and/or protocol.

Controller node 530 can comprise a processor and associated circuitry to execute or direct the execution of computer-readable instructions to obtain information. Controller node 530 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 530 can receive instructions and other input at a user interface.

Access node 512 can be in communication with access node 516 through communication link 534. Access node 512 can be in communication with access node 522 through communication link 536. Access node 522 can be in communication with gateway 528 through communication link 538. Access node 512 can be in communication with gateway 528 through communication link 540. Access node 516 can be in communication with gateway 528 through communication link 542. Access node 522 can be in communication with controller node 530 through communication link 544. Access node 512 can be in communication with controller node 530 through communication link 546. Access node 516 can be in communication with controller node 530 through communication link 548. Gateway 528 can be in communication with controller node 530 through communication link 550 and with communication network 532 through communication link 552. Communication links 534, 536, 538, 540, 542, 544, 546, 548, 550, 552 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 534, 536, 538, 540, 542, 544, 546, 548, 550, 552 can be a direct link or might include various equipment, intermediate components, systems, and networks.

Communication network 532 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 532 can be capable of carrying data, for example, to support voice, push-to-talk, broadcast video, and data communications by a wireless device such as wireless device 502. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 432 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 432 can also comprise additional base stations, controller nodes, telephony switches, internet routers, network gateways, computer systems, communication links, or some other type of communication equipment, and combinations thereof.

In operation, a network node such as access node 512 and/or controller node 530 can determine a scheduling scheme to communicate data packets between a first access node, such as access node 512, and first wireless devices, such as wireless devices 510, 511, in communication with access node 512, a second access node, such as access node 516, and second wireless devices, such as wireless devices 502, 504, in communication with access node 516, and a third access node, such as access node 522, and third wireless devices, such as wireless devices 506, 508, in communication with access node 522. In order to determine the scheduling scheme, the network nodes may monitor the efficiency of the transmission of data packets to identify possible improvements that decrease segmentation. For example, in some embodiments, the network nodes may operate in accordance with one or more of the methods of FIGS. 2 and 3 to maximize the efficiency of the transmission of the data packets to one or more of the wireless devices.

Figure 6:
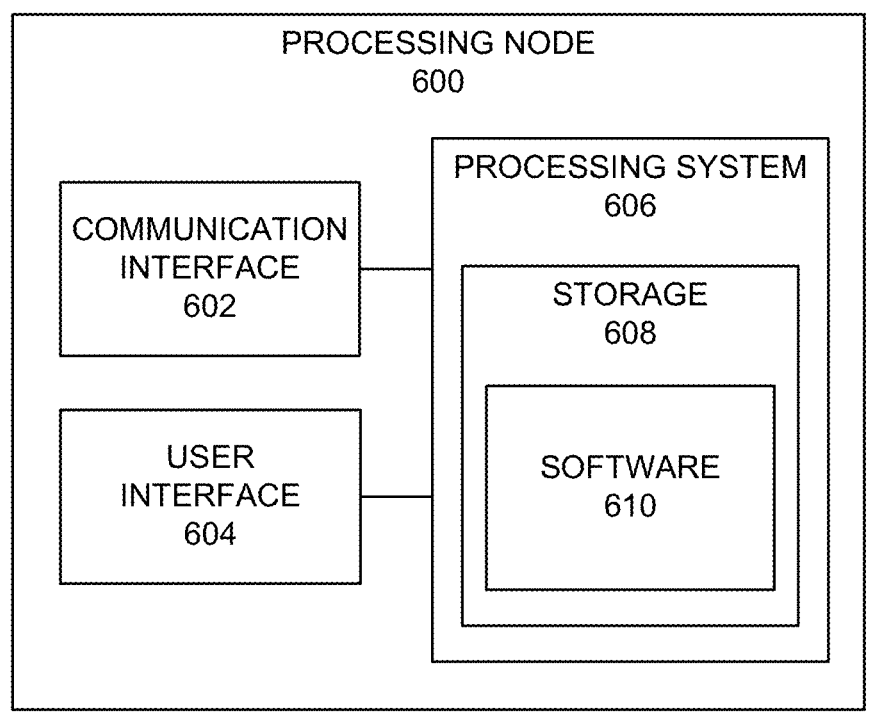
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to instruct the sending of data packets to a wireless device. Processing system 606 includes storage 608, which can include a disk drive, flash drive, memory circuitry, or other memory device. Storage 608 can store software 610, which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access node 104, a gateway node, and a controller node. Processing node 600 can also be an adjunct or component of a network element, such as an element of access node 104. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for determining a transmission order of packets in a wireless communication network, comprising:
   determining an efficiency of time frequency frame allocations performed by a network node over a predetermined period of time, wherein determining the efficiency comprises determining a quantity of data packets segmented across one or more transmission time intervals over a period of time;
   rearranging two or more time frequency frames in the one or more time transmission intervals when the quantity of data packets segmented across the one or more transmission time intervals over the period of time is determined to be below a threshold; and
   transmitting the packets to a wireless device based on the two or more time frequency frames.

2. The method of claim 1, wherein determining the efficiency of the time frequency frame allocations comprises determining a quantity of non-real time data packets segmented across the one or more transmission time intervals over the period of time.

3. The method of claim 1, wherein rearranging two or more time frequency frames comprises:
   identifying an optimally efficient time frequency frame allocation; and
   changing one or more weighting factors of one or more of the packets to change the transmission order of the packets to comply with the identified optimally efficient time frequency frame allocation.

4. The method of claim 3, wherein identifying the optimally efficient time frequency frame allocation comprises:
   identifying a plurality of possible time frequency frame allocations; and
   determining which of the plurality of possible time frequency frame allocations includes the fewest packets segmented across the one or more transmission time intervals.

5. The method of claim 1, comprising discarding one or more of the packets from the transmission order when the efficiency of the time frequency frame allocations is determined to be below the threshold.

6. The method of claim 1, wherein the threshold comprises a predetermined allowable quantity of non-real time data packet segmentations across the one or more transmission time intervals over the period of time.

7. The method of claim 1, wherein the threshold comprises a predetermined allowable quantity of real time and non-real time data packet segmentations across the one or more transmission time intervals over the period of time.

8. A method for determining a transmission order of packets in a wireless communication network, comprising:
   determining a packet delay budget and a packet delay for each of the packets;
   assigning a weighting factor to each of the packets based on the determined packet delay budget and the determined packet delay for each of the packets;
   scheduling the packets for transmission from a network node in the wireless communication network in order of the assigned weighting factors;
   determining whether a quantity of non-real time data packets segmented across one or more transmission time intervals over a period of time is below a threshold;
   changing the assigned weighting factor for one or more of the packets when the threshold is determined to be exceeded; and
   transmitting the packets to a wireless device in the order of the assigned weighting factors.

9. The method of claim 8, comprising determining, for each of the packets, whether the respective packet delay exceeds the packet delay budget.

10. The method of claim 9, comprising removing from the transmission order each of the packets for which the respective packet delay exceeds the packet delay budget.

11. The method of claim 8, comprising time stamping each of the packets when each of the packets is received by the network node.

12. The method of claim 8, wherein the packet delay budget for each of the packets is determined based on a quality of service class identifier associated with each packet.

13. A system for sending packets to a wireless device, the system comprising:
   a processing node configured to:
      receive two or more packets for transmission to the wireless device;
      schedule the two or more packets in a transmission order to the wireless device based on a packet delay budget and a packet delay for each of the packets;
      determine one or more time frequency frame allocations based on the transmission order;
      determine an efficiency of the time frequency frame allocations over a predetermined period of time, wherein determining the efficiency comprises determining a quantity of packets segmented across one or more transmission time intervals over the period of time;
      rearrange two or more time frequency frames in the one or more time transmission intervals when the quantity of packets segmented across the one or more transmission time intervals over the period of time is determined to be below a threshold; and
      transmit the two or more packets to a wireless device.

14. The system of claim 13, wherein the processing node is configured to remove one or more of the packets from the transmission order when the efficiency of the time frequency frame allocations is determined to be below the threshold.

15. The system of claim 13, wherein the threshold comprises a predetermined allowable quantity of non-real time data packet segmentations across the one or more transmission time intervals over the period of time.

16. The system of claim 13, wherein the processing node is configured to determine the efficiency of the time frequency frame allocations by determining a quantity of non-real time data packets segmented across the one or more transmission time intervals over the period of time.

17. The system of claim 13, wherein the processing node is configured to determine the packet delay budget for each of the packets based on a quality of service class identifier associated with each packet.

18. The system of claim 13, wherein the processing node is configured to time stamp each of the packets when each of the packets is received by the processing node.

19. The system of claim 13, wherein the threshold comprises a predetermined allowable quantity of real time and non-real time data packet segmentations across the one or more transmission time intervals over the period of time.

* * * * *